US012638593B2

(12) United States Patent
Lee et al.

(10) Patent No.: US 12,638,593 B2
(45) Date of Patent: May 26, 2026

(54) ROBOT COMPRISING LIDAR SENSOR AND METHOD CONTROLLING ROBOT

(71) Applicant: SAMSUNG ELECTRONICS CO., LTD., Suwon-si (KR)

(72) Inventors: Taehee Lee, Suwon-si (KR); Donghan Koo, Suwon-si (KR); Junghoe Kim, Suwon-si (KR); Kuyoung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 316 days.

(21) Appl. No.: 18/203,860

(22) Filed: May 31, 2023

(65) Prior Publication Data

US 2024/0036213 A1     Feb. 1, 2024

Related U.S. Application Data

(63) Continuation of application No. PCT/KR2023/006102, filed on May 4, 2023.

(30) Foreign Application Priority Data

Jul. 29, 2022     (KR) ......................... 10-2022-0094789

(51) Int. Cl.
        *G01S 17/931*        (2020.01)
        *G01S 7/481*        (2006.01)
        *G05D 1/00*        (2024.01)
(52) U.S. Cl.
        CPC ........... *G01S 17/931* (2020.01); *G01S 7/4811* (2013.01); *G05D 1/024* (2013.01)
(58) Field of Classification Search
        CPC .... G01S 17/931; G01S 7/4811; G01S 7/4972; G05D 1/024; G05D 2109/135;
(Continued)

(56) References Cited

U.S. PATENT DOCUMENTS 5,258,822 A     11/1993 Nakamura et al.
10,921,818 B2     2/2021 Ogawa et al.
(Continued)

FOREIGN PATENT DOCUMENTS

DE     10 2019 110 803 B3     7/2020
JP          2712061 B2     10/1997
(Continued)

OTHER PUBLICATIONS

David Kubalak, Theodore Hadjimichael, and Raymond Ohl, "Absolute Position of Targets Measured Through a Chamber Window Using Lidar Metrology Systems" 2012, NASA Tech Briefs, pp. 8 (Year: 2012).*

(Continued)

*Primary Examiner* — Aniss Chad
*Assistant Examiner* — Chase L Cooley
(74) *Attorney, Agent, or Firm* — Sughrue Mion, PLLC

(57) ABSTRACT

An electronic device includes: a first sensor mounted inside a body of the electronic device; a second sensor configured to sense a posture of the body; an optical device configured to: reflect light output from the first sensor by using a mirror, and output the reflected light to an outside of the electronic device through a transparent region in the electronic device; a processor configured to: obtain information on the posture of the body through the second sensor, obtain information on a tilting angle of the mirror based on the obtained posture of the body and a refractive index of the transparent region, and control the mirror based on the obtained information on the tilting angle.

20 Claims, 14 Drawing Sheets

(58) Field of Classification Search
CPC ...... G05D 1/242; G05D 2111/17; G05D 1/49;
B25J 5/00; B25J 9/16; B25J 13/08; B25J
19/02; B25J 5/007; B25J 9/1602; B25J
13/088; B25J 19/022
See application file for complete search history.

(56) References Cited

U.S. PATENT DOCUMENTS

| | | | |
|---|---|---|---|
| 11,105,900 B2 | 8/2021 | Sayyah et al. | |
| 12,429,876 B2 | 9/2025 | Kim et al. | |
| 2018/0231640 A1* | 8/2018 | Han | G01S 17/931 |
| 2019/0056484 A1* | 2/2019 | Bradley | G01S 7/4815 |
| 2019/0094874 A1* | 3/2019 | Ogawa | G05D 1/027 |
| 2021/0373169 A1 | 12/2021 | Tokura et al. | |
| 2022/0244357 A1* | 8/2022 | Lee | G02B 26/0833 |
| 2023/0297115 A1 | 9/2023 | Kim et al. | |

FOREIGN PATENT DOCUMENTS

| | | | |
|---|---|---|---|
| JP | 2005-288655 A | 10/2005 | |
| JP | 2006-4334 A | 1/2006 | |
| JP | 2009-229458 A | 10/2009 | |
| JP | 2017-227516 A | 12/2017 | |
| JP | 2018-105978 A | 7/2018 | |
| JP | 7022547 B2 | 2/2022 | |
| KR | 10-1079897 B1 | 11/2011 | |
| KR | 10-1417431 B1 | 7/2014 | |
| KR | 10-2015-0047215 A | 5/2015 | |
| KR | 10-2017-0036234 A | 4/2017 | |
| KR | 10-2022-0102058 A | 7/2022 | |
| WO | 2012/091807 A2 | 7/2012 | |
| WO | 2022/110062 A1 | 6/2022 | |
| WO | 2022/154242 A1 | 7/2022 | |

OTHER PUBLICATIONS

International Search Report (PCT/ISA/210) issued Sep. 1, 2023 by the International Searching Authority in counter International Patent Application No. PCT/KR2023/006102.
Written Opinion (PCT/ISA/237) issued Sep. 1, 2023 by the International Searching Authority in counter International Patent Application No. PCT/KR2023/006102.
Extended European Search Report issued May 19, 2025 by the European Patent Office for EP Patent Application No. 23846754.2.
Communication issued on Feb. 26, 2026 by the European Patent Office in European Patent Application No. 23846754.2.

* cited by examiner

<FRONT>

\<REAR\>

\<LEFT\>

<RIGHT>

100

LASER DIRECTION

610

| ANGLE OF BODY | TILTING ANGLE OF MIRROR |
|:---:|:---:|
| $a_1$ | $\theta_1$ |
| $a_2$ | $\theta_2$ |
| $a_3$ | $\theta_3$ |
| $\vdots$ | $\vdots$ |

FIG. 8

ROBOT COMPRISING LIDAR SENSOR AND METHOD CONTROLLING ROBOT

CROSS-REFERENCE TO RELATED APPLICATION(S)

This application is a bypass continuation of International Application No. PCT/KR2023/006102, filed on May 4, 2023, which is based on and claims priority to Korean Patent Application No. 10-2022-0094789, filed on Jul. 29, 2022, in the Korean Intellectual Property Office, the disclosures of which are incorporated by reference herein in their entireties.

BACKGROUND

1. Field

The disclosure relates to an electronic device (such as a robot) mounted with a light detection and ranging (LiDAR) sensor and a controlling method thereof

2. Description of Related Art

As an example of the electronic device, the robot may perform a sensing of a distance from an obstacle around the robot by using the LiDAR sensor. In order to perform the sensing by using the LiDAR sensor, the robot may need to include a space for penetrating infrared (IR) light generated from the LiDAR sensor. In particular, small robots may have limited interior arears, thus it would be difficult to have such space inside of the small robots.

SUMMARY

According to an aspect of the disclosure, an electronic device includes: a first sensor mounted inside a body of the electronic device; a second sensor configured to sense a posture of the body; an optical device configured to: reflect light output from the first sensor by using a minor, and output the reflected light to an outside of the electronic device through a transparent region in the electronic device; a processor configured to: obtain information on the posture of the body through the second sensor, obtain information on a tilting angle of the mirror based on the obtained posture of the body and a refractive index of the transparent region, and control the mirror based on the obtained information on the tilting angle.

According to another aspect of the disclosure, a method performed by an electronic device, includes: obtaining information on a posture of a body; obtaining information on a tilting angle of a mirror based on the obtained posture of the body and a refractive index of a transparent region in the electronic device; controlling the mirror based on the obtained information on the tilting angle; and reflecting light output from a first sensor through the mirror and outputting the reflected light to an outside of the electronic device through the transparent region.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8 illustrates a detailed configuration of the electronic device (such as the robot) according to one or more embodiments of the disclosure.

DETAILED DESCRIPTION

Figure 1:
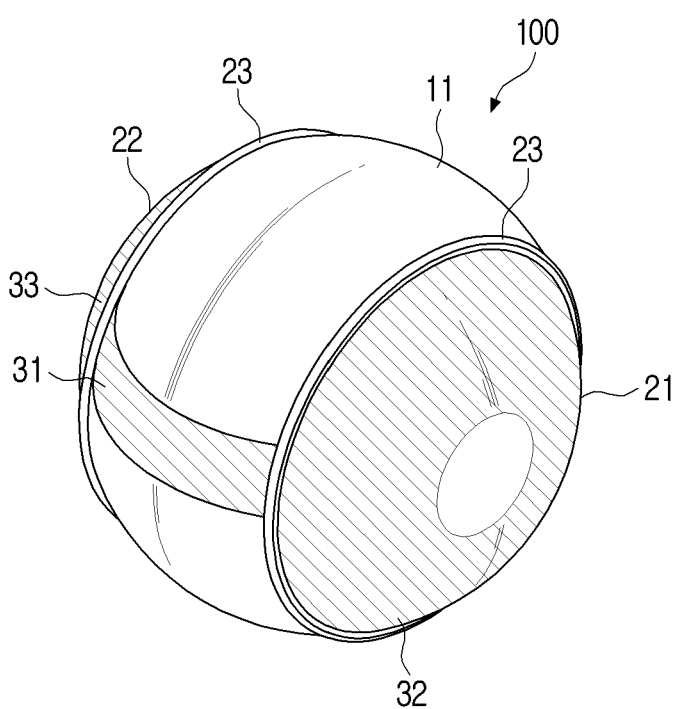
FIG. 1 illustrates an electronic device (such as a robot) according to one or more embodiments of the disclosure.

The disclosure includes one or more embodiments, some of which are illustrated in the drawings and described in detail in the detailed description. However, this disclosure is not intended to limit the embodiments described herein but includes various modifications, equivalents, and/or alternatives. In the context of the description of the drawings, like reference numerals may be used for similar components.

In describing the disclosure, a detailed description of known functions or configurations incorporated herein will be omitted as it may make the subject matter of the present disclosure unclear.

In addition, the embodiments described below may be modified in various different forms, and the scope of the technical concept of the disclosure is not limited to the following embodiments. Rather, these embodiments are provided so that this disclosure will be thorough and complete, and will fully convey the scope of the disclosure to those skilled in the art.

The terms used in this disclosure are used merely to describe a particular embodiment, and are not intended to limit the scope of the claims. The expression of a singular includes a plurality of representations, unless the context clearly indicates otherwise.

In this document, the expressions "have," "may have," "including," or "may include" may be used to denote the presence of a feature (e.g., a component, such as a numerical value, a function, an operation, a part, or the like), and does not exclude the presence of additional features.

The expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B, all together.

In addition, expressions "first", "second", or the like, used in the disclosure may indicate various components regardless of a sequence and/or importance of the components, will be used only in order to distinguish one component from the other components, and do not limit the corresponding components.

It is to be understood that an element (e.g., a first element) is "operatively or communicatively coupled with/to" another element (e.g., a second element) is that any such element may be directly connected to the other element or may be connected via another element (e.g., a third element).

On the other hand, when an element (e.g., a first element) is "directly connected" or "directly accessed" to another element (e.g., a second element), it can be understood that there is no other element (e.g., a third element) between the other elements.

Herein, the expression "configured to" can be used interchangeably with, for example, "suitable for," "having the capacity to," "designed to," "adapted to," "made to," or "capable of" The expression "configured to" does not necessarily mean "specifically designed to" in a hardware sense.

Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processor (CPU) or application processor (AP)) that can perform the corresponding actions by executing one or more software programs stored in the memory device.

The terms such as "module," "unit," "part", and so on are used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

The various elements and regions in the drawings are schematically drawn. Accordingly, the technical spirit of the present disclosure is not limited by the relative size or spacing depicted in the accompanying drawings.

Hereinafter, with reference to the attached drawings, embodiments will be described in detail so that those skilled in the art to which the disclosure belongs to can easily make and use the embodiments.

FIG. 1 is a diagram illustrating an electronic device (such as a robot) according to one or more embodiments of the disclosure. Please note that the robot is an example of the electronic device. Although the robot is discussed throughout the disclosure, embodiments of the disclosure are also applicable to other types of the electronic device, such as a kiosk, a surveillance station, or other devices including a sensor.

Referring to FIG. 1, an electronic device (such as a robot) 100 may include a body 11. The body 11 may be a central portion of the robot 100. A pair of wheels (a left wheel 21, a right wheel 22) may be provided on both sides of the body 11. That is, the left wheel 21 may be provided at the left side of the body 11, and the right wheel 22 may be provided at the right side of the body 11. In one embodiment, the left wheel 21 and the right wheel 22 may be provided to be symmetrical to each other.

In one embodiment, a shape of the robot 100 formed of the body 11, the left wheel 21, and the right wheel 22 may be a sphere shape. That is, the robot 100 may have an overall spherical shape.

The left wheel 21 and the right wheel 22 may be provided to be rotatable, e.g., by 360 degrees. Each of the left wheel 21 and the right wheel 22 may be provided with a contact member 23 provided at a portion adjacent to the body 11. In this case, the contact member 23 may be provided at a boundary portion between the left wheel 21 and the right wheel 22 and the body 11. In addition, the contact member 23 may be provided to surround a part of the outer surface of the left wheel 21 and the right wheel 22 and may be in contact with the ground. Accordingly, when the left wheel 21 and the right wheel 22 are rotated, the robot 100 may move.

The robot 100 may include a transparent region, which will be described in detail with reference to FIGS. 1, 2, and 3A to 3D.

According to an embodiment of the disclosure, the robot 100 may include transparent regions 31, 32, 33, 34. In one embodiment, partial regions 31, 32 of each of the front and rear surfaces of the body 11 may be transparent regions, and partial regions 33, 34 of each of the left and right wheels 21, 22 may be transparent regions.

Here, being transparent may denote that light (i.e., a laser) output from a sensor (e.g., a LiDAR sensor 110) mounted inside the robot 100 may be transmitted (or passed). In the disclosure, the LiDAR sensor is discussed as an example of the sensor used in the electronic device (e.g., the robot 100). However, the disclosure is not limited to the LiDAR sensor 110.

For this, the transparent regions (the left wheel 21, the right wheel 22, and the control member 23) may be implemented with a material that transmits light.

For example, when the LiDAR sensor outputs light having a wavelength of 905 nm, the transparent regions 31, 32, 33, 34 may be implemented with a material capable of transmitting light having a wavelength of 905 nm. That is, the transparent regions 31, 32, 33, 34 may be formed of a material capable of transmitting light in an infrared band.

As another example, when the LiDAR sensor outputs light having a wavelength of 1550 nm, the transparent regions 31, 32, 33, 34 may be implemented with a material capable of transmitting light having a wavelength of 1550 nm. That is, the transparent regions 31, 32, 33, 34 may be formed of a material capable of transmitting light in a microwave band.

The transparent regions 31, 32, 33, 34 serve to emit light output from a LiDAR sensor mounted inside the robot 100 to the outside of the robot 100. The transparent regions 31, 32, 33, 34 may be provided in some regions of the body 11 and the left wheel 21 and the right wheel 22 corresponding to the position at which the LiDAR sensor is mounted inside the robot 100.

Figure 2:
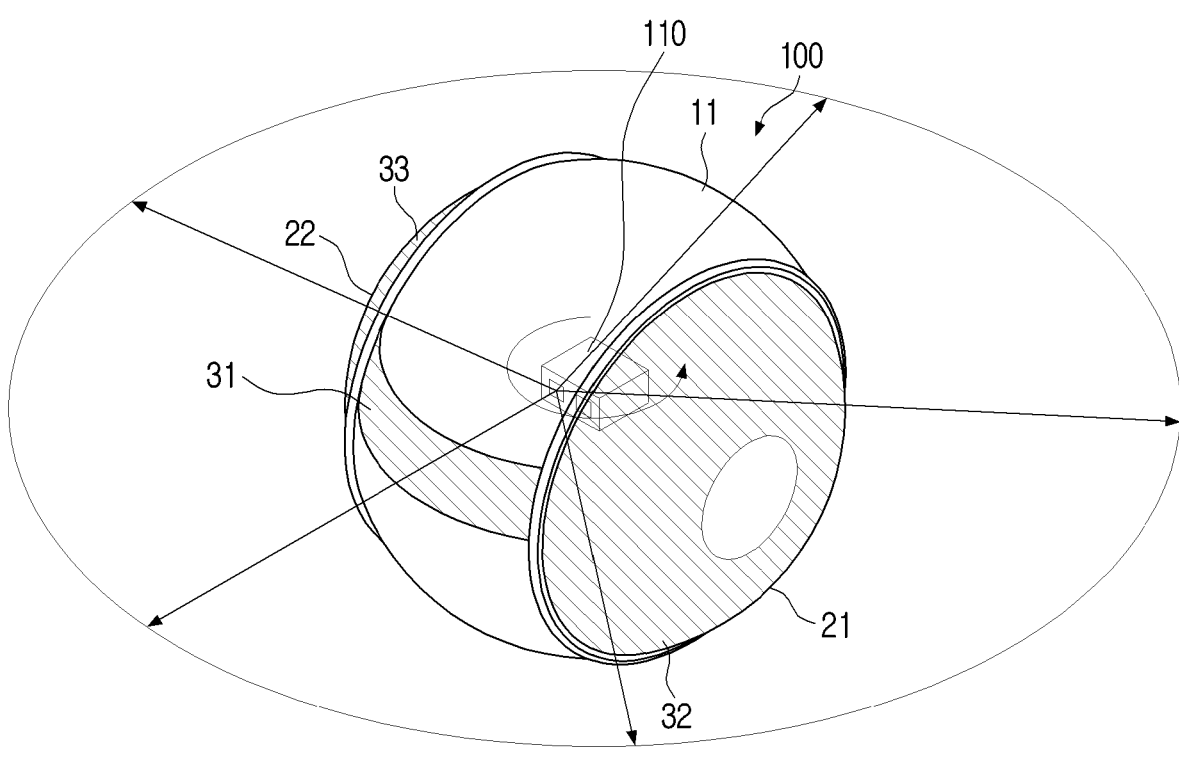
FIGS. 2, 3A to 3D illustrate a transparent region according to one or more embodiments of the disclosure.

For example, referring to FIG. 2, the LiDAR sensor 110 may be mounted in the body 11 of the robot 100. For example, the LiDAR sensor 110 may be installed at a position having a predetermined height with respect to the lower end of the body 11.

The LiDAR sensor 110 may rotate in 360 degrees and output light. For this, the LiDAR sensor 110 may include a light-emitting element/light-receiving element for transmitting and receiving light and a motor for rotating the elements in 360 degrees.

In one embodiment, the transparent region may include a first transparent region provided at a position corresponding to a position of the LiDAR sensor 110 on each of a front surface and a rear surface of the body 11, and a second transparent region provided in a doughnut shape in each of the left wheel and the right wheel.

Figure 3A:
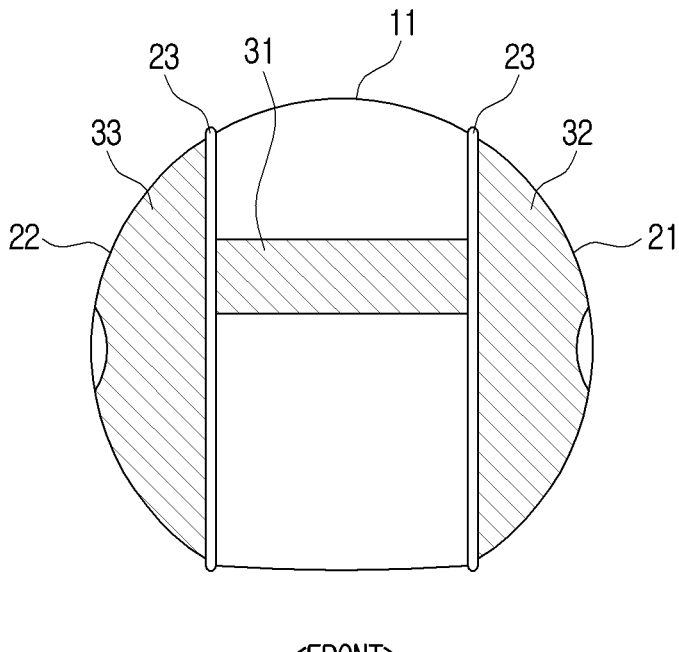
Figure 3B:
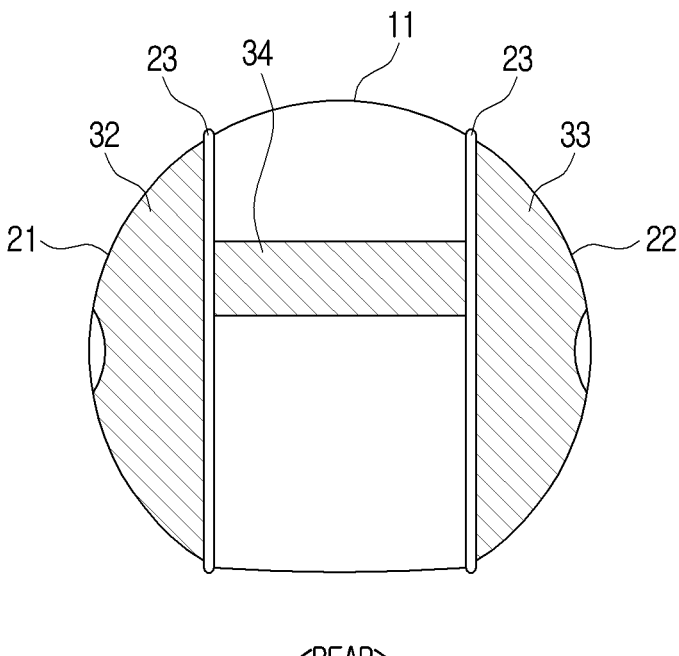
Figure 3C:
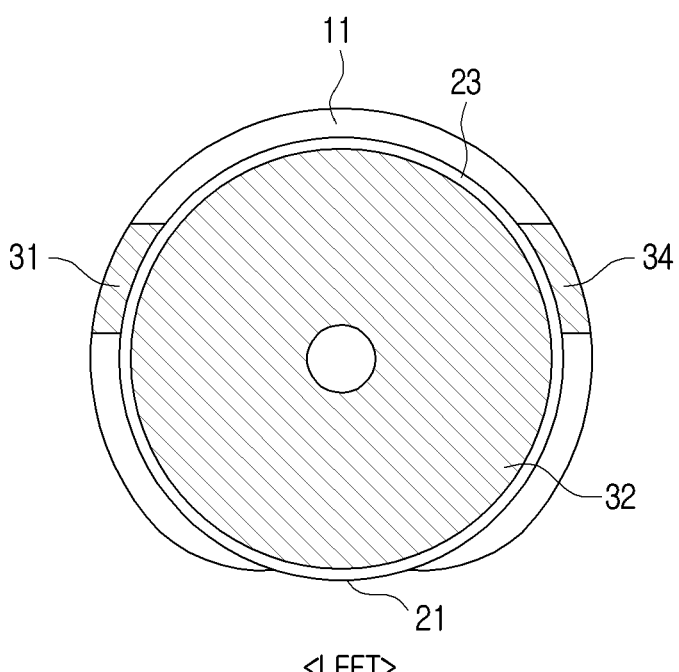
Figure 3D:
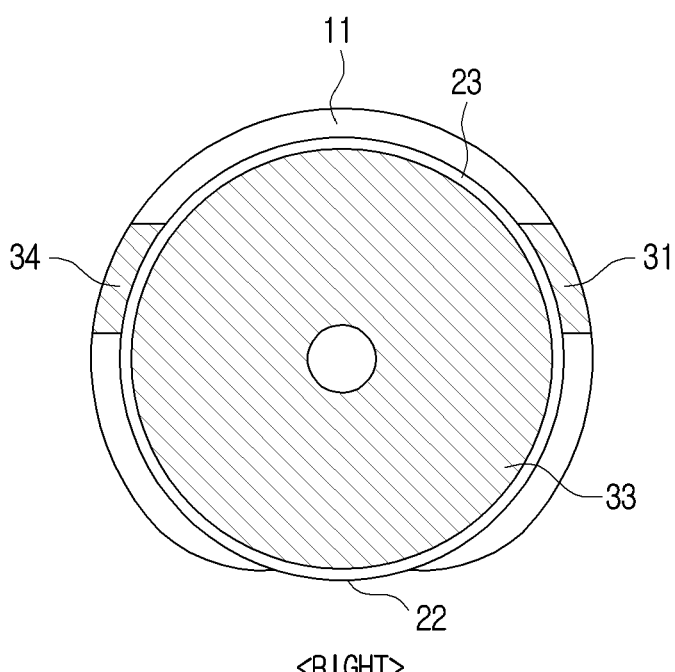

For example, referring to FIGS. 2, 3A, and 3D, the transparent regions 31, 34 on each of the front and rear surfaces of the body 11 may be formed at the same height as the height at which the LiDAR sensor 110 is installed in the body 11. The width of the transparent regions 31, 34 may be the same as the width of the body 11. The transparent regions 31, 34 may have a predetermined thickness. Accordingly, light output from the LiDAR sensor 110 may be emitted in the front and rear direction of the robot 100 through transparent regions 31, 34 provided on the front surface and the rear surface of the body 11, respectively.

In addition, referring to FIG. 2, FIG. 3C, and FIG. 3D, transparent regions 32 and 33 may be formed in a doughnut shape on each of the left wheel 21 and the right wheel 22. In this case, the position at which the doughnut shape is formed in the left wheel 21 and the right wheel 22 and the width of the doughnut shape may be determined based on the height at which the LiDAR sensor 110 is installed in the body 11.

For example, the doughnut-shaped outer side may be adjacent to the contact member 23. In a virtual plane parallel to the ground while being centered around the LiDAR sensor 110, the width of the doughnut shape may be determined so that the virtual plane may pass through the transparent regions 32, 33. Accordingly, even if the left wheel 21 and the right wheel 22 rotate, the light outputted from the LiDAR sensor 110 may be emitted in the left and right directions of the robot 100 through transparent regions 32, 33 provided in the left wheel 21 and the right wheel 22, respectively.

In the above-described example, a transparent region is provided in a partial region of the body 11 and the left wheel 21 and the right wheel 22, but this is merely an example. For example, the entire region of the body 11 may be formed as a transparent region. In addition, the entire region of the left wheel 21 and the right wheel 22 may be formed as a transparent region.

According to an embodiment of the disclosure, when the transparent regions (the left wheel 21, the right wheel 22, the contract member 23, 24) are formed on the body 11 and the left wheel 21 and the right wheel 22 of the robot 100, although the light outputted from the LiDAR sensor 110 may not pass through the contact member 23, a loss of an angle of view of the LiDAR sensor 110 may occur within a certain range, and most light may be output to the outside of the robot 100. Accordingly, when the LiDAR sensor 110 is installed inside the robot 100, an obstacle around the robot 100 may be detected by using the LiDAR sensor 110.

When the robot 100 moves, the body 11 may be tilted by inertia, and accordingly, a situation in which the LiDAR sensor 110 installed inside the body 11 is tilted may occur. In this case, the light output from the LiDAR sensor 110 may face a direction in which the body 11 is tilted, not in a direction parallel to the ground.

Figure 4A:
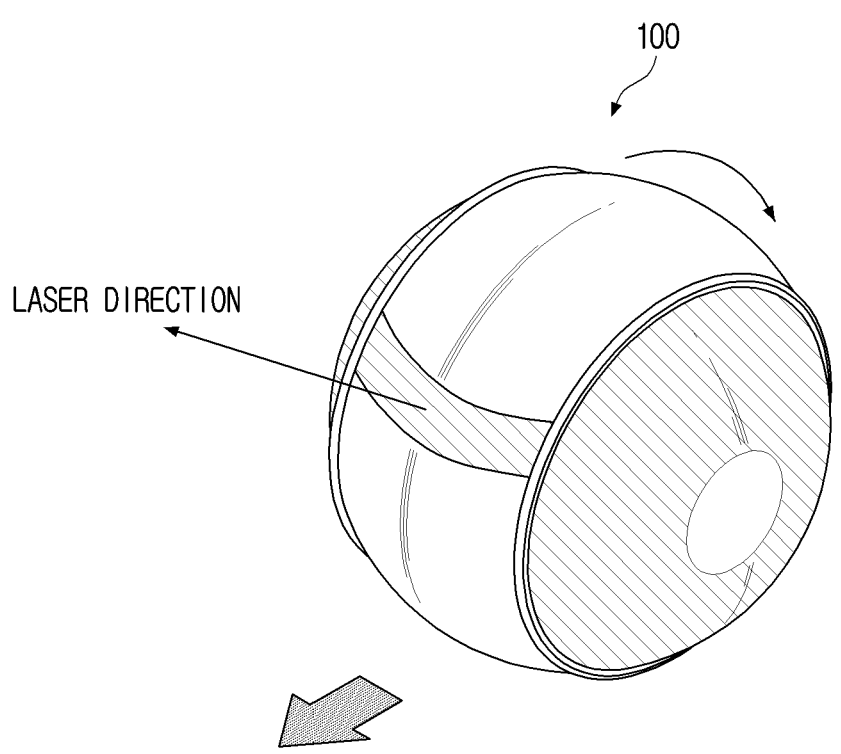
FIGS. 4A and 4B illustrate a situation in which a body of the electronic device (such as the robot) is tilted according to one or more embodiments of the disclosure.
Figure 4B:
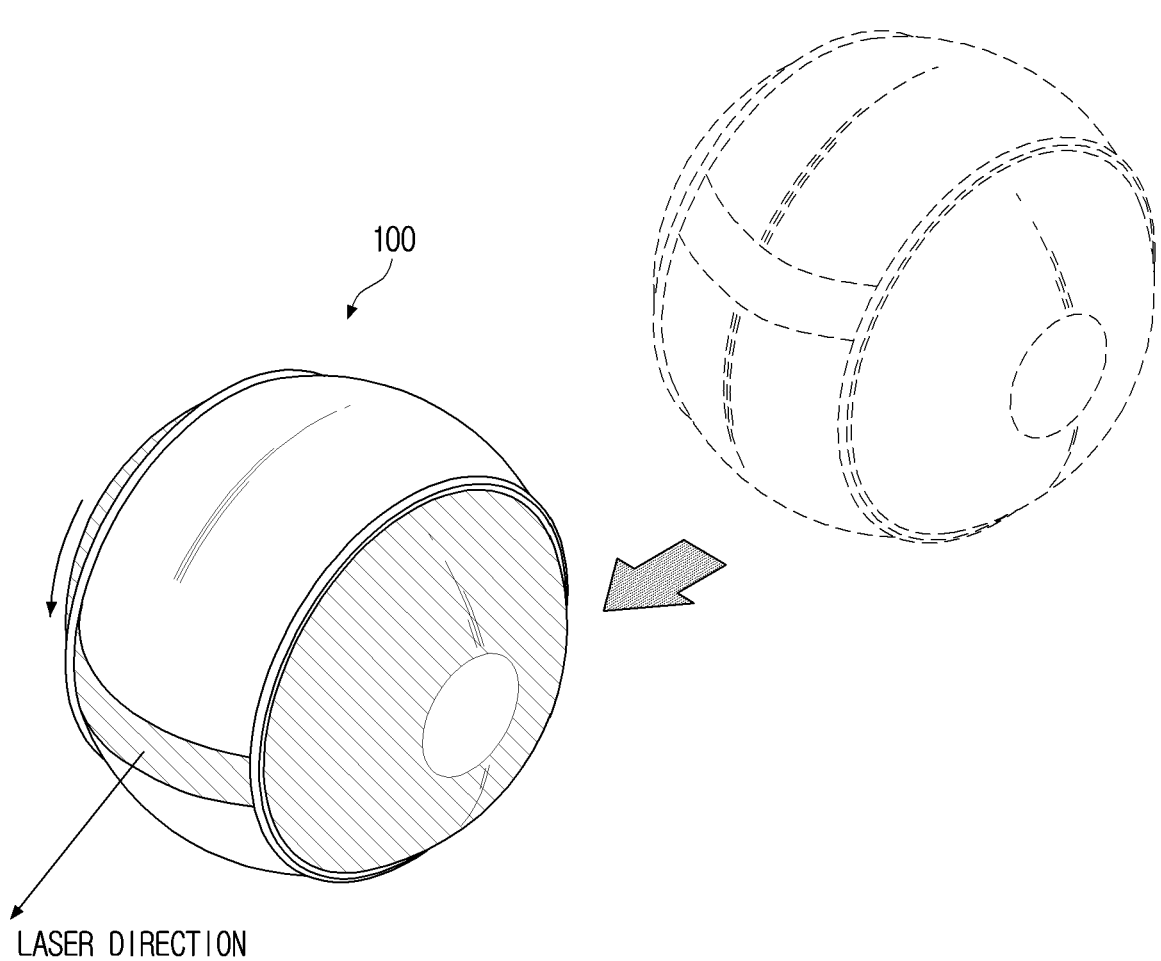

For example, as shown in FIG. 4A, when the robot 100 starts to move, the body 11 of the robot 100 may be tilted in a direction opposite to the moving direction by inertia. In this case, the light output from the LiDAR sensor 110 may face upward. As another example, as shown in FIG. 4B, when the moving robot 100 is stopped, the body 11 of the robot 100 may be tilted in a direction in which the robot 100 has moved due to inertia. In this case, light output from the LiDAR sensor 110 may be directed downward. In those cases, a distance from the obstacle around the robot 100 may not be accurately measured through the LiDAR sensor 110.

According to an embodiment of the disclosure, the robot 100 may change the direction of light output from the LiDAR sensor 110 through an optical device and output the light to the outside of the robot 100 in consideration of the posture of the body 11 and the refractive index of the transparent region. Therefore, according to an embodiment of the disclosure, when the body 11 of the robot 100 is tilted, light may be output in parallel with the ground, and the distance to the surrounding obstacle may be accurately detected through the LiDAR sensor 110.

Figure 5:
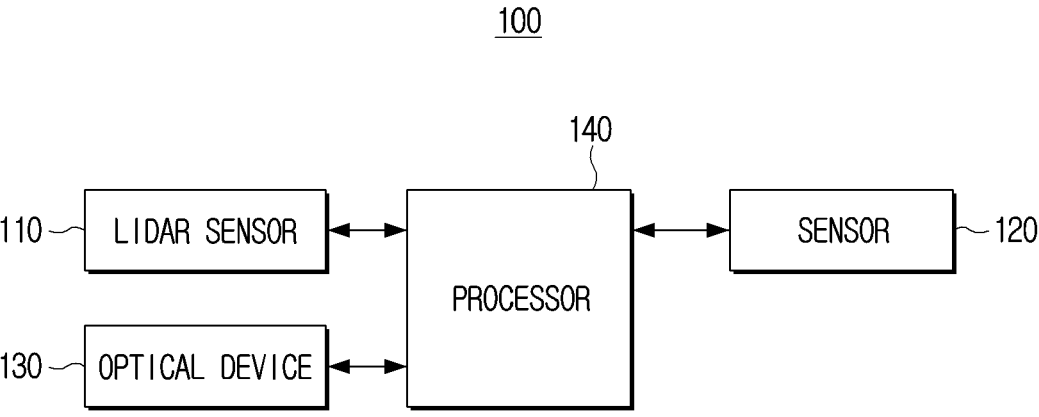
FIG. 5 illustrates a feature of the electronic device (such as the robot) according to one or more embodiments of the disclosure.

FIG. 5 is a block diagram illustrating a feature of an electronic device (such as a robot) according to one or more embodiments of the disclosure.

Referring to FIG. 5, the robot 100 may include the LiDAR sensor 110, the sensor 120, the optical device 130, and the processor 140. The LiDAR sensor 110 is an example of sensors included in the electronic device (such as the robot 100).

The LiDAR sensor 110 irradiates light, and when the irradiated light is reflected and received from an object (for example, an obstacle such as a wall, a home appliance, furniture, a person, a vehicle, etc.) around the robot 100, the LiDAR sensor 110 may detect a distance from the object based on the time when the light is received.

For this, the LiDAR sensor 110 may include a light-emitting element and a light-receiving element.

The light emitting element may output light. The light emitting device may include a circuit for outputting light. The light receiving element may receive the reflected light when the output light is reflected by the object. For this, the light receiving element may include a circuit for receiving light.

In addition, the LiDAR sensor 110 may rotate in a 360-degree direction and output light. For this, the LiDAR sensor 110 may include a light emitting element and a motor for rotating the light receiving element at 360 degrees.

The sensor 120 may sense posture of the body 11. Here, the posture of the body 11 may mean an angle at which the body 11 is tilted.

For this, the sensor 120 may include an inertial measurement unit (IMU) sensor. For example, the sensor 120 may sense a tilted angle of the body 11 by using at least one of a three-axis acceleration sensor and a three-axis gyro sensor. The sensor 120 may be mounted on the processor 140 or may be provided in the robot 100 separately from the processor 140.

The optical device 130 may change the path of light. For this, the optical device 130 may include a mirror. Here, the mirror may be a micro electro mechanical system (MEMS) mirror.

Specifically, the optical device 130 may output the reflected light to the outside of the robot 100 through transparent regions 31, 32, 33, 34 provided in the robot 100 by reflecting light output from the LiDAR sensor 110 by using a mirror.

When the light outputted to the outside of the robot 100 is reflected by an object around the robot 100 and received by the robot 100, the optical device 130 may reflect the received light by using a mirror and output the light by the LiDAR sensor 110.

For this, the mirror may include a first mirror capable of adjusting an angle and arranged in front of the light emitting element. In addition, the mirror may include a second mirror capable of adjusting an angle and arranged in front of the light receiving element.

The processor 140 controls overall operations of the robot 100. Specifically, the processor 140 may be connected to a configuration of the robot 100 including the LiDAR sensor 110, the sensor 120, and the optical device 130, and executes at least one instruction stored in the memory to control the overall operation of the robot 100. In this case, the processor 140 may be implemented with a plurality of processors as well as a single processor. In some embodiments, the term processor 140 may be a central processing unit (CPU), an application processor (AP), and the like.

The processor 140 may obtain information on the posture of the body 11 through the sensor 120. Here, the posture of the body 11 may denote an angle at which the body 11 is tilted.

The processor 140 may obtain information on the tilting angle based on the obtained posture of the body 11 and a refractive index of the transparent regions 31, 32, 33, 34. The processor 140 may control the mirror based on the obtained information on the tilting angle.

When the body 11 of the robot 100 is tilted, the LiDAR sensor 110 installed inside the body 11 may also be tilted, and accordingly, the light output from the LiDAR sensor 110 may be output in a direction in which the body 11 is tilted.

In order to prevent this point, the processor 140 may obtain information on the tilting angle of the mirror corresponding to the posture of the body 11, and may adjust the angle of the mirror, thus the mirror is tilted according to the obtained tilting angle. Accordingly, when the body 11 is tilted, the light reflected by the mirror may be output in a direction parallel to the ground.

The LiDAR sensor 110 may be mounted inside the robot 100, and the light output from the LiDAR sensor 110 may pass through the transparent regions 31, 32, 33, 34 and may be output to the outside of the robot 100. Here, when light passes through the transparent regions 31, 32, 33, 34, the light may be refracted by the transparent regions 31, 32, 33, 34. Accordingly, the processor 140 may adjust the angle of the mirror in consideration of the posture of the body 11 of the robot 100 and the refractive index of the transparent regions 31, 32, 33, 34, thus enabling the light passing through the transparent regions 31, 32, 33, 34 to move in a horizontal direction.

The robot 100 may further include a memory configured to store information on a plurality of tilting angles corresponding to a plurality of postures of the body 11 obtained based on the refractive index of the transparent regions 31, 32, 33, 34.

Here, the plurality of tilting angles may be angles to enable lights reflected by the mirror from each of the plurality of postures of the body to be refracted by the transparent region and output in a direction parallel with the ground. The light output to the outside of the robot 100 through the transparent region may travel in a horizontal direction.

A plurality of tilting angles may be experimentally measured and stored in the memory of the robot 100. Specifically, according to an embodiment of the disclosure, it may be measured at which incident angle light should be incident on a transparent region, so that light may be output in a direction parallel to the ground when the light is refracted in a transparent region and then output to outside the transparent region. In addition, for an angle at which the body 11 is tilted, it is possible to measure which degree the mirror should be tilted in order to allow the light outputted from the LiDAR sensor 110 to be incident on the transparent region at the measured incidence angle. According to the method, the tilting angle of the mirror may be measured for the angle at which the body 11 is tilted, and the information on the measured tilting angle may be stored in the memory.

Accordingly, the processor 140 may obtain information on the tilting angle of the mirror corresponding to the obtained posture of the body 11 among the information stored in the memory. That is, the processor 140 may obtain information on an angle at which the body 11 is tilted through the sensor 120, and may identify a tilting angle corresponding to an angle obtained through the sensor 120 among a plurality of tilting angles matched with a plurality of angles of the body 11 and stored.

Figure 6:
FIG. 6 illustrates an example of information on a tilting angle stored in a memory according to one or more embodiments of the disclosure.

For example, as shown in FIG. 6, in the memory, information 610 on a tilting angle of a mirror corresponding to each angle of the body 11 may be stored in a table form. For example, the angle of the body 11 sensed by the sensor 120 is $a_1$. In this case, the processor 140 may obtain a tilting angle ($\theta_1$) matched with the angle a1 of the body 11 among a plurality of tilting angles ($\theta_1$, $\theta_2$, $\theta_3$, . . . ).

The processor 140 may adjust the angle of the mirror such that the mirror is tilted according to the obtained tilting angle. In addition, the processor 140 may output light through the LiDAR sensor 110. Accordingly, the light output from the LiDAR sensor 110 may be reflected by the mirror and output to the outside of the robot 100 through the transparent region.

Specifically, the processor 140 may adjust the angles of the first mirror and the second mirror such that the first mirror and the second mirror are tilted at the obtained tilting angle. Accordingly, the light output from the light emitting element may be reflected by the first mirror and then refracted by the transparent region to be output to the outside of the robot 100. In this case, the outputted light may move horizontally from the ground. In addition, when the light output to the outside of the robot 100 is reflected by an object around the robot 100, the reflected light may enter the robot 100 through the transparent region. At this time, the light may be reflected by the second mirror and provided to the LiDAR sensor 110.

Figure 7A:
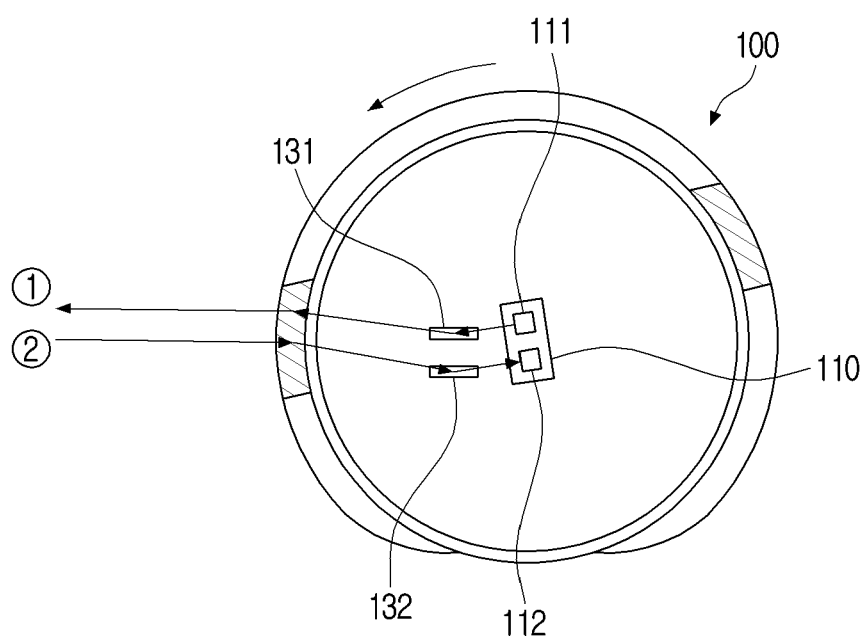
FIGS. 7A and 7B illustrates light output to outside of the electronic device (such as the robot) according to one or more embodiments of the disclosure.

For example, as shown in FIG. 7A, the body 11 of the robot 100 may be tilted counterclockwise. The processor 140 may obtain a tilting angle (for example, $\theta_2$) of the mirror corresponding to the tilted angle of the body 11, and control the first mirror 131 and the second mirror 132 such that the first mirror 131 and the second mirror 132 are tilted by the tilting angle ($\theta_2$).

Accordingly, the light output from the light emitting element 111 may be reflected by the first mirror 131 tilted by a tilting angle ($\theta_2$), and the reflected light may be refracted by the transparent region and outputted to the outside of the robot 100. At this time, the light outputted to the outside of the robot 100 may proceed horizontally (see FIG. 7A-①).

Also, light outputted to the outside of the robot 100 through the transparent region may be reflected by an object around the robot 100 and received in the robot 100. In this case, the reflected light may be refracted by the transparent region, and the refracted light may be reflected by the second mirror 132 tilted by a tilting angle ($\theta_2$) and received by the light receiving element 112 (see FIG. 7A-②).

Figure 7B:
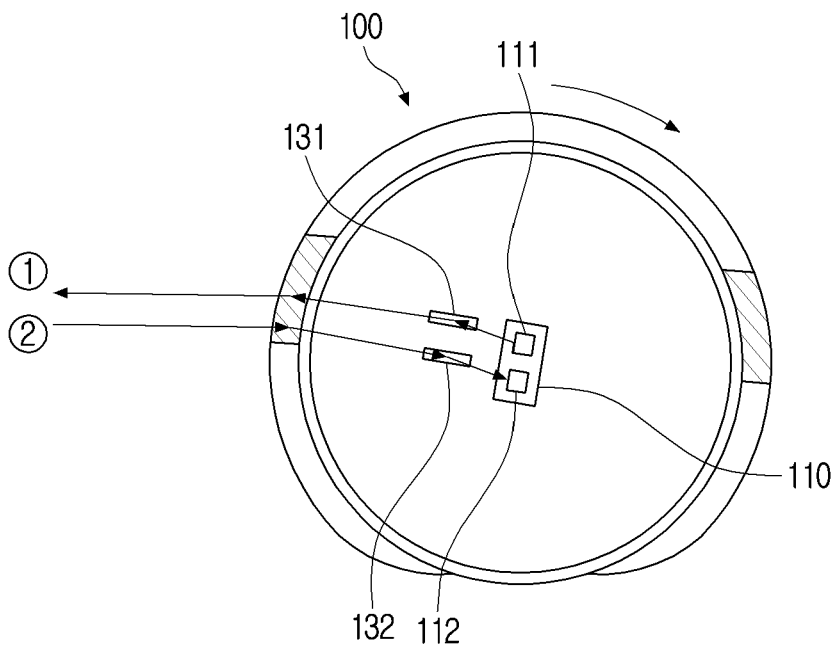

As another example, as shown in FIG. 7B, the body 11 of the robot 100 is tilted in a clockwise direction. The processor 140 may obtain a tilting angle (for example, $\theta_3$) of the mirror corresponding to the tilted angle of the body 11, and control the first mirror 131 and the second mirror 132 such that the first mirror 131 and the second mirror 132 are tilted by the tilting angle ($\theta_3$).

Accordingly, the light output from the light emitting element 111 is reflected by the first mirror 131 tilted by a tilting angle ($\theta_3$), and the reflected light is refracted by the transparent region and outputted to the outside of the robot 100. At this time, the light outputted to the outside of the robot 100 may proceed horizontally (see FIG. 7B-①).

Also, light outputted to the outside of the robot 100 through the transparent region may be reflected by an object around the robot 100 and received in the robot 100. In this case, the reflected light may be refracted by the transparent region, and the refracted light may be reflected by the second minor 132 tilted by a tilting angle ($\theta_3$) and received by the light receiving element 112 (see FIG. 7B-②).

According to an embodiment of the disclosure, when the body 11 of the robot 100 is tilted, the light output from the LiDAR sensor 110 installed inside the robot 100 may move parallel to the ground from the outside of the robot 100. Accordingly, when the body 11 of the robot 100 having the LiDAR sensor 110 mounted is tilted, the surrounding obstacle may be accurately detected.

In one embodiment, the processor 140 may identify a distance from the object around the robot 100 through the LiDAR sensor 110.

Specifically, when the light output from the LiDAR sensor 110 is reflected and received from an object around the robot 100, the processor 140 may detect the distance between the robot 100 and the object based on the time at which the light is received.

In addition, the processor 140 may perform various operations by using the sensed distance. For example, the processor 140 may generate a map for a space in which the robot 100 is located or identify a position of the robot 100 on the map by using a sensed distance and a simultaneous localization and mapping (SLAM) algorithm. In addition, the processor 140 may establish a traveling plan in consideration of the position of the robot 100 on the map, and control the robot 100 to travel while avoiding the object on the map.

Figure 8:
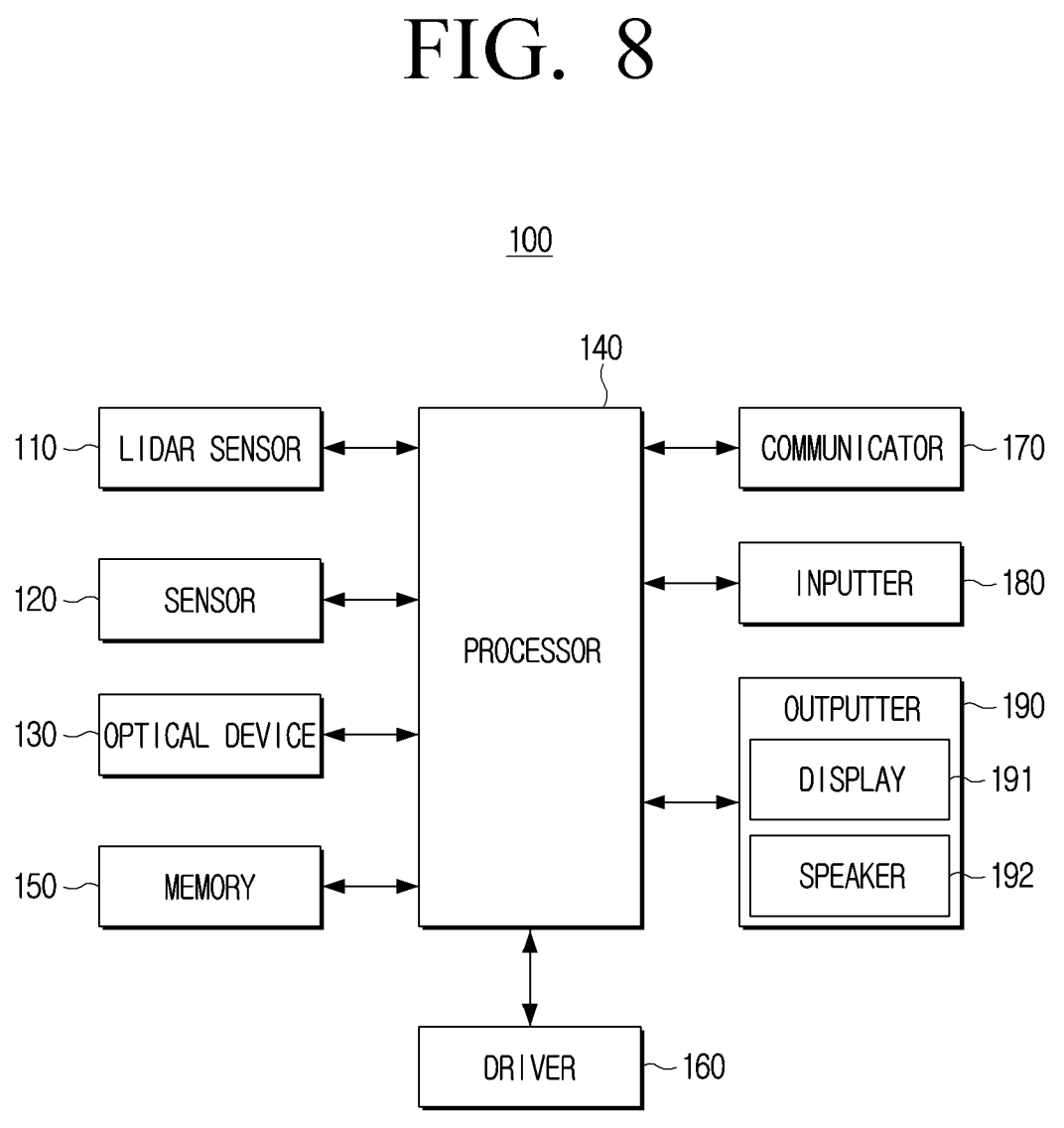

FIG. 8 is a block diagram illustrating a detailed configuration of an electronic device (such as a robot) according to one or more embodiments of the disclosure.

As shown in FIG. 8, the robot 100 may further include a memory 150, a driver 160, a communicator 170, an inputter 180, an outputter 190, and the like, in addition to the LiDAR sensor 110, the sensor 120, the optical device 130, and the processor 140. However, this is merely exemplary, and in practicing the disclosure, a new configuration may be added or some components may be omitted in addition to such a configuration. In the description of FIG. 8, descriptions overlapping with FIGS. 1 to 7 will be omitted.

The memory 150 may store at least one instruction and at least one software program for driving the robot 100. In this case, the memory 150 may include a semiconductor memory such as a flash memory or the like. The term memory 130 may include the memory 150, a ROM, a RAM in the processor 140, or a memory card (for example, a micro SD card or a memory stick) mounted on the robot 100.

In particular, the memory 150 may store information on a plurality of tilting angles corresponding to a plurality of postures of the body 11 obtained based on the refractive index of the transparent regions 31, 32, 33, 34. In this case, the processor 140 may obtain information on the tilting angle of the mirror corresponding to the posture of the body 11 obtained through the sensor 120 by using the information stored in the memory 150.

The driver 160 is configured to drive the left wheel 21 and the right wheel 22. For this, the driver 160 may include a rotary shaft connected to the left wheel 21 and the right wheel 22 and a motor for driving the left wheel 21 and the right wheel 22 by transmitting power to the rotary shaft. Accordingly, the processor 140 may drive the wheels 21 and 22 through the driver 160 to perform various driving operations such as movement, stop, speed control, direction change, angular velocity change, or the like, of the robot 100. For example, the processor 140 may control the driver 160 to avoid an object by using information on a distance from an object obtained through the LiDAR sensor 110.

The communicator 170 includes a circuit. The communicator 170 may communicate with an external device. The processor 140 may receive various data or information from an external device connected through the communicator 170, and may transmit various data or information to an external device.

The inputter 180 includes a circuit. The inputter 180 may receive a user command for setting or selecting various functions supported by the robot 100. For this, the inputter 180 may include a plurality of buttons. In addition, the inputter 180 may be implemented as a touch screen capable of simultaneously performing functions of a display 191.

In this case, the processor 140 may control the operation of the robot 100 based on a user command input through the inputter 180. For example, the processor 140 may control the robot 100 based on an on/off command of the robot 100 input through the inputter 180 of the robot 100, an on/off command of a function of the robot 100, and the like.

The outputter 190 may include the display 191 and a speaker 192.

The display 191 may display various information. For this, the display 191 may be implemented as a liquid crystal display (LCD) liquid or the like. The display 191 may be implemented as a touch screen capable of simultaneously performing functions of the inputter 180. Specifically, the processor 140 may display, on the display 191, information related to the operation of the robot 100.

The speaker 192 may output audio. Specifically, the processor 140 may output various notification sounds or voice guidance messages related to the operation of the robot 100 through the speaker 192.

In FIG. 8, the robot 100 may further include a camera. The camera may capture the front of the robot 100. In this case, the processor 140 may recognize an object from an image obtained through the camera to obtain information about a type, a size, a distance to the object, and the like of an object existing around the robot 100. The processor 140 may control the driver 160 to avoid the identified object.

Figure 9:
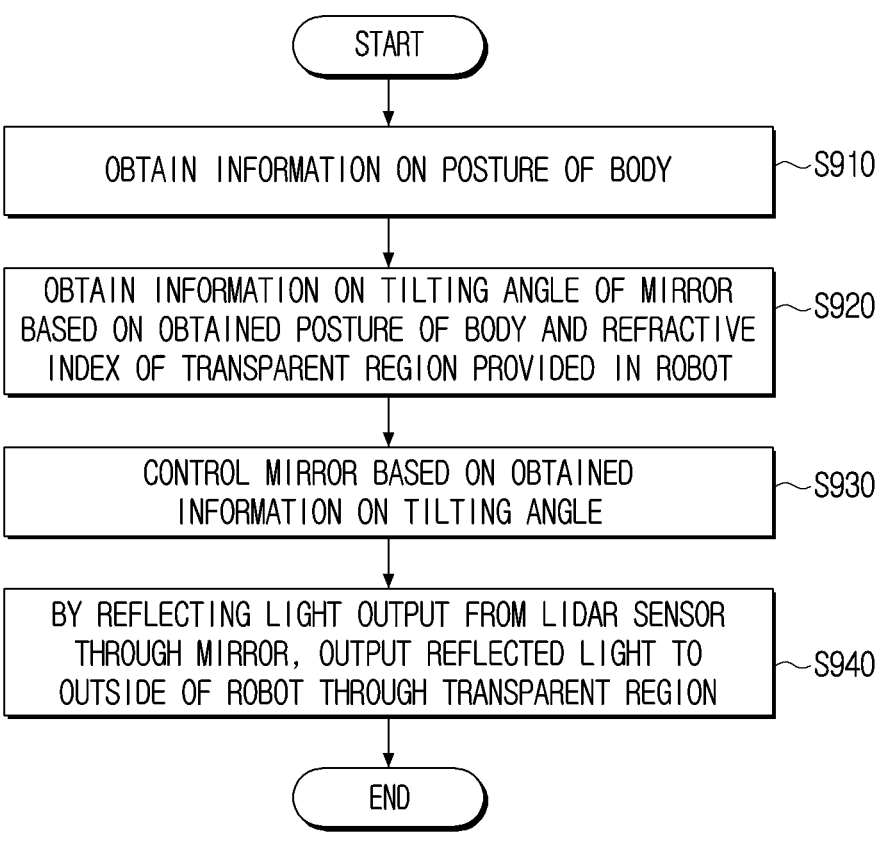
FIG. 9 illustrates a control method according to one or more embodiments of the disclosure.

FIG. 9 is a flowchart illustrating a control method according to one or more embodiments of the disclosure. Here, the LiDAR sensor may be mounted inside the body of the robot.

First, information on a posture of the body is obtained in operation S910. The information on a tilting angle of the mirror based on the obtained posture of the body and a refractive index of the transparent region provided in the robot is obtained in operation S920.

The mirror is controlled based on the obtained information on the tilting angle in operation S930. By reflecting light output from the LiDAR sensor through the mirror, the reflected light is output to outside of the robot through the transparent region in operation S940.

In S920, information on a tilting angle of the mirror comprises obtaining information on a tilting angle corresponding to the obtained posture of the body among the information on a plurality of tilting angles corresponding to the obtained plurality of postures of the body based on the refractive index of the transparent region may be obtained.

Herein, the plurality of tilting angles may be angles to enable lights reflected by the mirror from each of the plurality of postures of the body to be refracted by the transparent region and output in a direction parallel with the ground.

A 360-degree rotatable left wheel and a right wheel may be provided on left and right sides of a body constituting a central portion of the robot. A shape of the robot comprising the body and the wheel may have a spherical shape. In addition, the LiDAR sensor may output the light while rotating 360 degrees.

The transparent region may include a first transparent region provided at a position corresponding to a position of the LiDAR sensor on each of a front surface and a rear surface of the body, and a second transparent region provided in a doughnut shape in each of the left wheel and the right wheel.

The LiDAR sensor includes a light emitting element to output the light; and a light receiving element to, based on the output light being reflected by an object, receive the reflected light. The mirror may include a first mirror capable of adjusting an angle and arranged in a front of the light emitting element. The mirror may include a second mirror capable of adjusting an angle and arranged in a front of the light receiving element.

In S930, the angles of the first mirror and the second mirror may be adjusted so that the first mirror and the second mirror are tilted at the obtained tilting angle.

The transparent region may be implemented with a material that passes light output from the LiDAR sensor.

According to one or more embodiments described above, the methods may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a portion of the computer program product (e.g., downloadable app) may be at least temporarily stored or provisionally generated on the storage media such as a manufacturer's server, the application store's server, or a memory in a relay server.

Each of the components (for example, a module or a program) according to one or more embodiments may be composed of one or a plurality of objects, and some sub-components of the subcomponents described above may be omitted, or other subcomponents may be further included in the embodiments. Alternatively or additionally, some components (e.g., modules or programs) may be integrated into one entity to perform the same or similar functions performed by each respective component prior to integration.

Operations performed by a module, program, or other component, in accordance with embodiments, may be performed sequentially, in a parallel, repetitive, or heuristic manner, or at least some operations may be performed in a different order, omitted, or other operations can be added.

The term "unit" or "module" used in the disclosure includes units includes hardware, software, or firmware, or any combination thereof, and may be used interchangeably with terms such as, for example, logic, logic blocks, parts, or circuits. A "unit" or "module" may be an integrally constructed component or a minimum unit or part thereof that performs one or more functions. For example, the module may be configured as an application-specific integrated circuit (ASIC).

A non-transitory computer readable medium storing a program for sequentially performing a controlling method may be provided. The non-transitory computer-readable medium does not refer to a medium that stores data for a short period of time, such as a register, cache, memory, etc., but semi-permanently stores data and is available of reading by the device. Specifically, programs of performing the above-described various methods can be stored in a non-transitory computer readable medium such as a CD, a DVD, a hard disk, a Blu-ray disk, universal serial bus (USB), a memory card, ROM, or the like, and can be provided.

Furthermore, one or more embodiments of the disclosure may be implemented in software, including instructions stored on machine-readable storage media readable by a machine (e.g., a computer). An apparatus may call instructions from the storage medium, and execute the called instruction, including an electronic apparatus (for example, robot 100) according to the embodiments herein.

When the instructions are executed by a processor, the processor may perform a function corresponding to the instructions directly or by using other components under the control of the processor. The instructions may include code generated by a compiler or code executable by an interpreter.

While example embodiments of the disclosure have been illustrated and described, the disclosure is not limited to the specific embodiments described above. It will be understood by those skilled in the art that various changes in form and details may be made therein without departing from the true spirit and full scope of the disclosure, including the appended claims and their equivalents.

What is claimed is:

1. An electronic device comprising:
a first sensor mounted inside a body of the electronic device;
a second sensor configured to sense a posture of the body;
an optical device configured to:
reflect light output from the first sensor by using at least one mirror, and
output the reflected light to an outside of the electronic device through a transparent region in the electronic device; and
a processor configured to:
obtain information on the posture of the body through the second sensor,
obtain information on a tilting angle of the at least one mirror based on the obtained information on the posture of the body and based on a refractive index of the transparent region, and
control the at least one mirror based on the obtained information on the tilting angle.

2. The electronic device of claim 1, wherein the electronic device is a robot.

3. The electronic device of claim 1, wherein the first sensor is a light detection and ranging (LiDAR) sensor.

4. The electronic device of claim 1, further comprising a memory configured to store information on a plurality of tilting angles corresponding to a plurality of postures of the body obtained based on the refractive index of the transparent region,
wherein the processor is further configured to obtain information on the tilting angle corresponding to the obtained information on the posture of the body among the information on the plurality of tilting angles corresponding to the plurality of postures of the body.

5. The electronic device of claim 4, wherein the plurality of tilting angles are angles to enable lights reflected by the at least one mirror from a posture of the plurality of postures of the body to be refracted by the transparent region and output in a direction parallel with a ground.

6. The electronic device of claim 1, further comprising:
a left wheel on a left side of the body, and
a right wheel on a right side of the body.

7. The electronic device of claim 6, wherein the left wheel and the right wheel are 360-degree rotatable,
wherein a shape of the electronic device is spherical, and wherein the first sensor outputs the light while rotating at 360 degrees.

8. The electronic device of claim 6, wherein the transparent region comprises:

a first transparent region provided at a position corresponding to a position of the first sensor on a front surface of the body or a rear surface of the body, and a second transparent region provided in the left wheel or the right wheel.

9. The electronic device of claim 1, wherein the transparent region comprises a material that passes the light output from the first sensor.

10. The electronic device of claim 1, wherein the first sensor comprises:

a light emitting element configured to output the light; and a light receiving element configured to, based on the output light being reflected by an object, receive the reflected light, wherein the at least one mirror comprises:

a first mirror configured to adjust a first angle and provided in front of the light emitting element; and a second mirror configured to adjust a second angle and provided in front of the light receiving element.

11. The electronic device of claim 10, wherein the processor is further configured to adjust the first angle of the first mirror and the second angle of the second mirror to the obtained tilting angle.

12. A method performed by an electronic device, the method comprising:

obtaining information on a posture of a body;

obtaining information on a tilting angle of at least one mirror based on the obtained information on the posture of the body and based on a refractive index of a transparent region in the electronic device;

controlling the at least one mirror based on the obtained information on the tilting angle; and reflecting light output from a first sensor through the at least one mirror and outputting the reflected light to an outside of the electronic device through the transparent region.

13. The method of claim 12, wherein the reflecting light output from the first sensor comprises reflecting light output from a light detection and ranging (LiDAR) sensor.

14. The method of claim 12, wherein the obtaining information on the tilting angle of the at least one mirror comprises obtaining information on the tilting angle corresponding to the obtained information on the posture of the body among information on a plurality of tilting angles corresponding to a plurality of postures of the body.

15. The method of claim 14, wherein the plurality of tilting angles are angles to enable lights reflected by the at least one mirror from a posture of the plurality of postures of the body to be refracted by the transparent region and output in a direction parallel with a ground.

16. The method of claim 12, wherein a left wheel and a right wheel are provided on left and right sides of the body constituting a central portion of the electronic device, wherein a shape of the electronic device comprising the body, the left wheel, and the right wheel has a spherical shape, and wherein the first sensor outputs the light while rotating 360 degrees.

17. The method of claim 16, wherein the left wheel and the right wheel are 360-degree rotatable.

18. The method of claim 16, wherein the transparent region comprises:

a first transparent region provided at a position corresponding to a position of the first sensor on a front surface or a rear surface of the body, and a second transparent region provided in the left wheel or the right wheel.

19. The method of claim 12, wherein the first sensor comprises:

a light emitting element configured to output the light; and a light receiving element configured to, based on the output light being reflected by an object, receive the reflected light, wherein the at least one mirror comprises:

a first mirror configured to adjust a first angle and provided in front of the light emitting element; and a second mirror configured to adjust a second angle and provided in front of the light receiving element.

20. The method of claim 19, wherein the controlling comprises adjusting the first angle of the first mirror and the second angle of second mirror to the obtained tilting angle.

* * * * *